United States Patent
Le Peltier et al.

(10) Patent No.: US 6,511,593 B1
(45) Date of Patent: Jan. 28, 2003

(54) HOMOGENEOUS BED OF CATALYST AND A PROCESS FOR TRANSFORMING HYDROCARBONS INTO AROMATIC COMPOUNDS USING SAID BED

(75) Inventors: Fabienne Le Peltier, Rueil Malmaison (FR); Jean-Marie Deves, Vernouillet (FR); Olivier Clause, Chatou (FR); Frédéric Kolenda, Francheville le Haut (FR); Nathalie Brunard, Francheville le Haut (FR)

(73) Assignee: Institut Francais de Petrole, Malmaison Cedex (FR)

( * ) Notice: Subject to any disclaimer, the term of this patent is extended or adjusted under 35 U.S.C. 154(b) by 0 days.

(21) Appl. No.: 09/502,797

(22) Filed: Feb. 11, 2000

Related U.S. Application Data

(63) Continuation of application No. 09/331,976, filed on Jun. 30, 1999, now abandoned, which is a continuation of application No. PCT/FR98/02329, filed on Oct. 30, 1998.

(30) Foreign Application Priority Data

Oct. 31, 1997 (FR) .............................................. 97 13689

(51) Int. Cl.[7] .......................... C10G 35/06; C07C 5/333
(52) U.S. Cl. ..................... 208/139; 585/407; 585/434; 585/442; 585/444; 585/445; 502/230; 502/227; 502/228; 502/231
(58) Field of Search ................................ 502/228, 229, 502/230, 231; 585/407, 434, 442, 444, 445; 208/139

(56) References Cited

U.S. PATENT DOCUMENTS

| | | | | |
|---|---|---|---|---|
| 4,677,094 A | * | 6/1987 | Moser et al. | 502/227 |
| 5,012,027 A | * | 4/1991 | Abrevaya et al. | 585/443 |
| 5,128,300 A | | 7/1992 | Tai-Hsiang et al. | |
| 5,166,121 A | | 11/1992 | Gyanesh et al. | |

FOREIGN PATENT DOCUMENTS

| | | |
|---|---|---|
| EP | 0 490 696 | 6/1992 |
| EP | 0 512 766 | 11/1992 |
| WO | 91 17825 | 11/1991 |

\* cited by examiner

Primary Examiner—Bekir L. Yildirim
(74) Attorney, Agent, or Firm—Millen, White, Zelano & Branigan, P.C.

(57) ABSTRACT

The invention relates to a homogeneous bed of catalyst particles comprising at least one amorphous matrix, at least one noble metal, at least one additional metal M and at least one halogen, and in which, for a catalyst particle:

$C_{Pt}$ is the local concentration of noble metal;
$C_M$ is the local concentration of additional metal M;
$C_x$ is the local concentration of halogen;

in which catalyst particle bed the local dispersion of the value of $C_{Pt}/C_M$ or $C_{Pt}/C_x$ is termed homogeneous along the diameter of the particle, which corresponds to at least 70% of the values $C_{Pt}/C_M$ or $C_{Pt}/C_x$ deviating by a maximum of 30% from the local average ratio.

The invention also relates to a process for transforming hydrocarbons into aromatic compounds with the catalyst, such as a gasoline reforming process and a process for producing aromatic compounds.

22 Claims, 4 Drawing Sheets

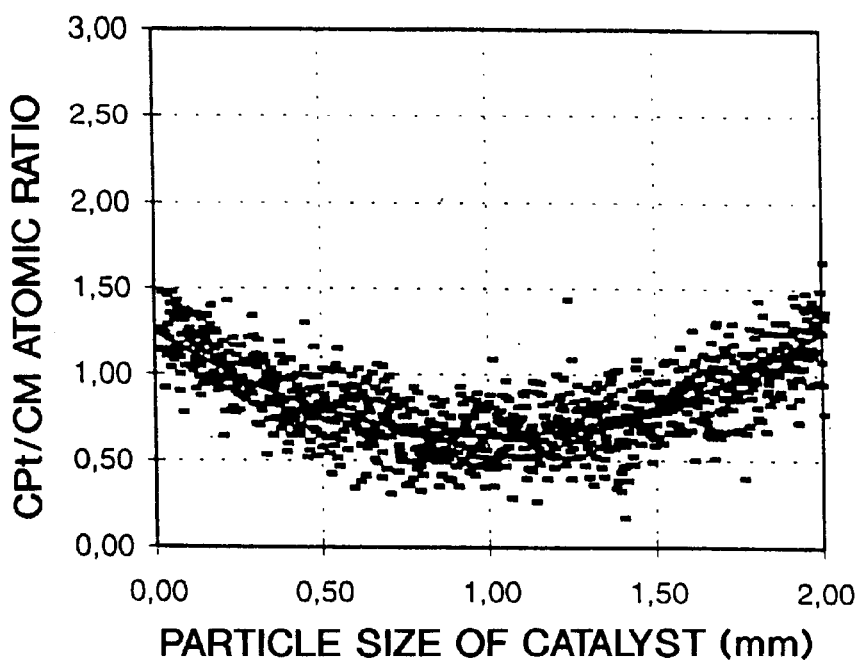
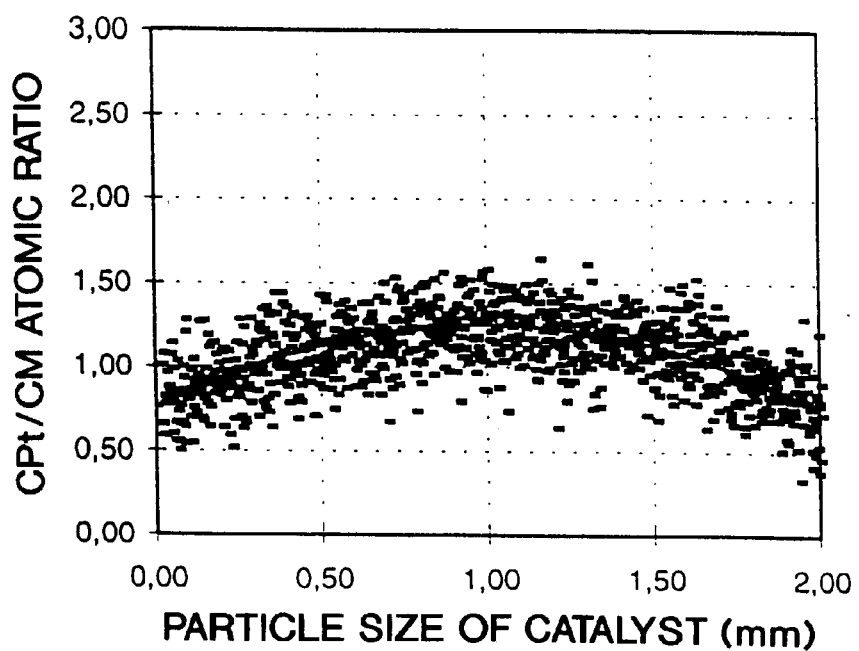

HOMOGENEOUS BED OF CATALYST AND A PROCESS FOR TRANSFORMING HYDROCARBONS INTO AROMATIC COMPOUNDS USING SAID BED

This is a continuation of application Ser. No. 09/331,976 filed Jun. 30, 1999, now abandoned which is a 371 of PCT/FR98/023,298B1 filed Oct. 30, 1998.

The present invention relates to a homogeneous bed and catalyst particles with improved bimetallic and bifunctional effects, the catalyst particles having reduced local composition fluctuations, resulting in much improved catalytic performances, in particular as regards activity and gasoline yields. Such a bed is termed "homogeneous on a micronic scale". Such particles can even be termed "homogeneous on a nanometric scale". The invention also relates to a process for transforming hydrocarbons into aromatic compounds using that catalyst, such as a gasoline reforming process and a process for producing aromatic compounds.

Catalysts for gasoline reforming and/or for aromatic compound production are well known. They generally contain a matrix, at least one noble metal from the platinum family, at least one halogen and at least one promoter metal, also known as an additional metal.

Of the promoter metals, tin in particular is used for regenerative processes and rhenium is used for fixed bed processes.

Catalysts for gasoline reforming and/or for aromatic compound production are bifunctional catalysts having two functions which are essential for producing the correct performances: a hydro-dehydrogenating function which dehydrogenates naphthenes and hydrogenates coke precursors, and an acid function which isomerises the naphthenes and paraffins and cyclises long paraffins. The hydro-dehydrogenating function can be provided by an oxide such as molybdenum oxide $MoO_3$, chromium oxide $Cr_2O_3$ or gallium oxide $Ga_2O_3$, or by a metal from column 10 (Ni, Pd, Pt). Metals, in particular platinum, are known to be much more active than oxide phases for hydro-dehydrogenating reactions, and for this reason metallic catalysts have replaced supported oxide catalysts when reforming gasoline and/or producing aromatic compounds. However, metals such as Ni, and to a lesser extent palladium and platinum, also exhibit a hydrogenolysing activity, to the detriment of the desired gasoline yields when reforming gasoline and/or when producing aromatic compounds. This hydrogenolysing activity can be substantially reduced, and thus the catalyst selectivity can be increased, by adding a second metal such as tin. Further, adding a second metal such as iridium or rhenium increases the hydrogenating properties of the platinum, encouraging hydrogenation of coke precursors and thus increasing the catalyst stability. These various reasons have encouraged the success of bimetallic catalysts over first generation monometallic catalysts. More recently, trimetallic catalysts have been introduced, which retain the increased stability of bimetallic catalysts while increasing the gasoline selectivities of such catalysts.

Selectivity can be increased by various means. In the prior art, U.S. Pat. No. 5,128,300 recommends, for catalyst extrudates, a homogeneous distribution of tin with a local composition fluctuation of no better than 25% about the average tin content, that being 0.1–2% by weight of the catalyst.

We have discovered, and this constitutes the subject matter of the present invention, that catalyst performances could be substantially improved not only by limiting the variation of a single element, but by controlling the relative fluctuations of the ratio of the concentrations (compositions) of noble metal (platinum) to the additional metal and/or of the concentrations (compositions) of noble metal (platinum) to the halogen. Thus homogeneity of the bimetallic noble metal—additional metal effect and/or the bifunctional noble metal-acid effect is obtained in the particle bed which improves the overall performances of the process in which this catalyst is used.

More precisely, the invention is concerned with a catalyst comprising at least one amorphous matrix, at least one noble metal, at least one additional metal M and at least one halogen, and in which, for one catalyst particle, $C_{Pt}$ is the local concentration of noble metal, $C_M$ is the local concentration of additional metal M, and $C_x$ is the local concentration of halogen, in which catalyst in the form of a homogeneous catalyst particle bed the local dispersion of the value of $C_{Pt}/C_M$ or $C_{Pt}/C_x$ is termed homogeneous, which corresponds to at least 70% of the values $C_{Pt}/C_M$ or $C_{Pt}/C_x$ for the catalyst particle bed deviating by a maximum of 30% from the local average ratio.

The amorphous catalyst matrix is generally a refractory oxide such as magnesium, titanium or zirconium oxide, alumina or silica, used alone or mixed together. The preferred support contains alumina or it is alumina.

For gasoline reforming reactions and/or aromatic compound production reactions, the preferred matrix is alumina, and advantageously the specific surface area is 50–600 $m^2/g$, preferably 150–400 $m^2/g$.

The catalyst also contains at least one noble metal from the platinum family (Pt, Pd, Rh, Ir), preferably platinum. The catalyst can advantageously contain a noble metal (such as Pt) and also iridium.

The additional metal M is selected from the group formed by tin, germanium, lead, gallium, indium, thallium, rhenium, manganese, chromium, molybdenum and tungsten. In the case of processes for reforming gasoline and/or for producing regenerative aromatic compounds in a moving bed, the preferred metal is tin, and very advantageously it is associated with platinum (catalysts containing Pt, Sn) and more advantageously, the catalyst further contains tungsten (catalysts containing Pt, Sn, W).

In fixed bed processes, the preferred metal is rhenium; very advantageously it is combined with platinum (catalysts containing Pt, Re); more advantageously still, the catalyst contains indium (catalysts containing Pt, Re, In); further, tungsten can be present (catalysts containing Pt, Re, W or Pt, Re, In, W).

The halogen is selected from the group formed by fluorine, chlorine, bromine and iodine. Chlorine is preferred.

The catalyst generally contains 0.01% to 2% by weight of a noble metal, 0.1% to 15% of a halogen and 0.005% to 10% of an additional metal. Preferably, the catalyst also contains at most 2% of additional metal M, and very advantageously better than 0.1% of that metal. Under these preferred conditions, the catalyst will perform better due to the optimised bimetallic effect.

It should also be noted that the catalyst used in gasoline reforming and/or aromatic compound production processes preferably contains practically no alkali.

The catalyst is in the form of a bed in the form of particles which may be beads, extrudates, three-lobed particles or any other routinely used form.

$C_{Pt}$ is the local concentration of noble metal (expressed in % by weight) (the noble metal not necessarily being platinum), $C_M$ is the local concentration (by weight) of the additional metal and $C_x$ is the local concentration (by weight) of halogen.

The concentrations can also be expressed in atomic %, as the relative fluctuations will be the same.

The overall composition of the catalyst can be determined by X ray fluorescence carried out on the powdered catalyst or by atomic absorption after acid attack of the catalyst.

In contrast to the overall composition of the catalyst, the local composition on the micronic scale can be measured using an electronic microprobe and can if necessary be complemented by STEM (scanning transmission electron microscopy). This measurement can be made by determining the platinum and additional metal contents in some zones of a few cubic microns along the diameter of a catalyst particle, termed the measurement units. This measurement enables the macroscopic distribution of the metals inside the particles to be determined.

The analyses are carried out using a JEOL JXA8800 electronic microprobe (preferred apparatus) or if necessary using a CAMEBAX type Microbeam, each provided with four wavelength dispersion spectrometers. The acquisition parameters were as follows: acceleration voltage 20 kV, current 30 nA, Pt Mα, Sn Lα, Cl Kα lines, and count time 20 s or 40 s depending on the level of concentration. The particles (in the figures they were beads) were coated with resin then polished down to their diameter.

It should be noted that the designation "diameter" does not refer only to a bead or extrudate shape, but more generally to any particle shape; the term "diameter" is used to designate the representative length of the particle on which the measurement is made.

The measurements are made on a representative sample of the bed or catalyst batch which will be used for a catalytic bed. It was considered that the analyses ought to be made on at least 5 particles with at least 30 measurements per particle, uniformly distributed along the diameter.

$C_{Pt}$ denotes the local concentration of noble metal (expressed as % by weight) (the noble metal not necessarily being platinum), $C_M$ denotes the local concentration (by weight) of the additional metal, and $C_x$ denotes the local concentration (by weight) of halogen.

The concentrations could also be expressed in atomic %, the relative fluctuations being the same.

On the basis of the local measurements of $C_{Pt}$, $C_M$ and $C_x$ (measurements corresponding to a specific position on the diameter of a particle), the local $C_{Pt}/C_M$ and/or $C_{Pt}/C_x$ ratios can be calculated.

For each radial position, an average local ratio $[C_{Pt}/C_M]_m$ and/or $[C_{Pt}/C_x]_m$ is calculated (average of the local ratios corresponding to different particles).

Thus the absolute values of the differences between each ratio $C_{Pt}/C_M$ measured locally and the corresponding average local ratio $[C_{Pt}/C_M]_m$ can be determined. These values are termed "local dispersions".

In accordance with the invention, said dispersion is termed homogeneous, meaning that at least 70%, preferably at least 80%, of the values of $C_{Pt}/C_M$ or $C_{Pt}/C_x$ for the catalyst particle bed deviate by a maximum of 30% from the average local ratio.

It is thus said that the local dispersion corresponds for at least 70% of the particles to a confidence interval better than 30%. Preferably, this criterium of homogeneity of the local dispersions is reduced to 30%, preferably 20%, advantageously 15%, even 10%, and even 7% or 5% (that is to say that the values deviate by a maximum of 20% etc . . . )

Thus at any point in the catalyst, a variation in the amount of element M is accompanied by a controlled variation in the platinum content, such that the ratio Pt/M remains within an optimum spread. This approach enables the "bimetallic effect" to be fully expressed.

The bimetallic effect corresponds to the quality of the interaction between the platinum and the metal M, which effect conditions the performance level of the catalyst.

An optimum ratio $C_{Pt}/C_M$ frequently exists (atomic ratio or % by weight) to one side of which the "bimetallic effect" is little pronounced and beyond which the activity of the catalyst is reduced by an excess of additional metal. Such an optimum is also observed in trimetallic catalysts between the noble metal and metal M. To fully benefit from the bimetallic effect resulting from adding one or more additional metals, it is important that the $CP_{Pt}/C_M$, ratios determined locally for each catalyst particle, varies as little as possible about this optimum value.

A further very important parameter for the catalytic performance of catalysts, in particular those used for gasoline reforming and/or for aromatic compound production, is the amount of halogen (chlorine), in particular the local halogen concentration with respect to the local concentration of noble metal. In this case it is a bifunctional metal-acid effect.

The halogen (chlorine) is responsible for the acid function of catalysts which undertake isomerisation and cyclisation of $C_6$–$C_{11}$ paraffins. For each catalyst, there is an optimum halogen (chlorine) content. For chlorine contents below this optimum content, catalysts suffer from a lack of activity in particular as regards dehydrocyclisation of $P_7$–$P_9$ paraffins. For chlorine contents over this optimum content, the catalysts exhibit an excessive cracking activity resulting in a large production of $C_3$–$C_4$ fuel gas, and thus a drop in gasoline yields. The optimum chlorine concentration depends on the nature of the support, on its specific surface area and on its structure. It is usually close to 1.0% by weight in commercial catalysts but can be significantly above or below that value for certain particular supports, or in the presence of doping elements such as silicon included in the support.

This results in local $C_{Pt}/C_x$ concentration ratios which are significantly different from the local average ratio, resulting in mediocre catalytic performances.

Normally, the local ratio $C_{Pt}/C_M$ or the local ratio $C_{Pt}/C_x$ is constant along the diameter of the catalyst particle. The profile $C_{Pt}/C_M$ as a function of diameter is thus a "flat profile", like a profile of $C_{Pt}$, $C_M$ or $C_x$ with diameter (depending on the case). The noble metal and/or metal M and/or halogen is uniformly distributed in the particle.

For a given particle (preferably, bead), it is possible to determine the absolute values of the differences between each ratio $C_{Pt}/C_x$ determined locally and the $[C_{Pt}/C_M]_P$ or $[C_{Pt}/C_x]_P$ average ratio, respectively, in the particle. These values are termed "the radial dispersion in a particle".

According to the invention, said dispersion is termed homogeneous on each particle, which means that at least 70% of the values, preferably 80%, deviate by a maximum of 30% from the average value in the particle.

Preferably, this radial dispersion is reduced to 30%, preferably to 20%, advantageously to 15%, even 10%, and even to 7%, or, better, 5%.

In the same way as before, it is thus said that the radial dispersion corresponds for at least 70% of the particles to a confidence interval of better than 30%.

For a given catalyst batch (e.g. for good representation, at least 5 particles, at least 30 measurements per particle) it is possible to determine absolute values of the differences between each ratio $C_{Pt}/C_M$ or $C_{Pt}/C_x$ determined locally and the $[C_{Pt}/C_M]_L$, or, respectively, $[C_{Pt}/C_x]_L$ overall average ratio in the batch (average of all the ratios in all the particles). These values are termed, "the overall dispersion".

According to the invention, said dispersion is termed homogeneous, which means that at least 70% of the values, preferably 80%, deviate by a maximum of 30% from the average value in the batch (overall average ratio).

Preferably, this overall dispersion is reduced to 30%, preferably to 20%, advantageously to 15% or even 10%, and even 7% or 5%.

In the same way as before, it is thus said that the overall dispersion corresponds, for at least 70% of the particles, to a confidence interval which is better than 30%.

It is also of interest to prepare catalysts with different core and peripheral concentrations $C_{Pt}$, $C_M$ or $C_x$. These catalysts have "bowl" or "dome" distribution profiles. These catalysts with bowl or dome $C_M$ or $C_{Pt}$ distributions are of interest in certain applications where the effects of diffusion rates of the reactants or products in the catalyst are exploited.

In that case, the value of the local average ratio $[C_{Pt}/C_M]_m$ varies as a function of the particle diameter. This variation can substantially follow a parabolic curve.

A further distribution type is the "surface-layer" distribution where the noble metal and/or metal M are distributed at the surface.

In general, the core/edge ratio of concentrations $C_{Pt}$, $C_M$ or $C_x$ at the centre and periphery of the catalyst particles can vary from 0.1 to 3.

In the preferred variation, the catalyst contains at least one metal M and the noble metal (preferably Pt) uniformly distributed in the catalyst particle.

In a further possibility, the catalyst contains at least one metal M uniformly distributed in the whole catalyst, the noble metal being "bowl" distributed. In a further variation, at least one metal M is uniformly distributed throughout the catalyst, the noble metal being "surface-layer" distributed.

Metal M in the above case is advantageously tin. Preferably, the platinum and tin are bowl distributed.

FIGS. 1 to 4 illustrate the invention and the prior art:

FIGS. 1A and 1B show bowl or dome distributions (not attached to the examples),

Figure 2:
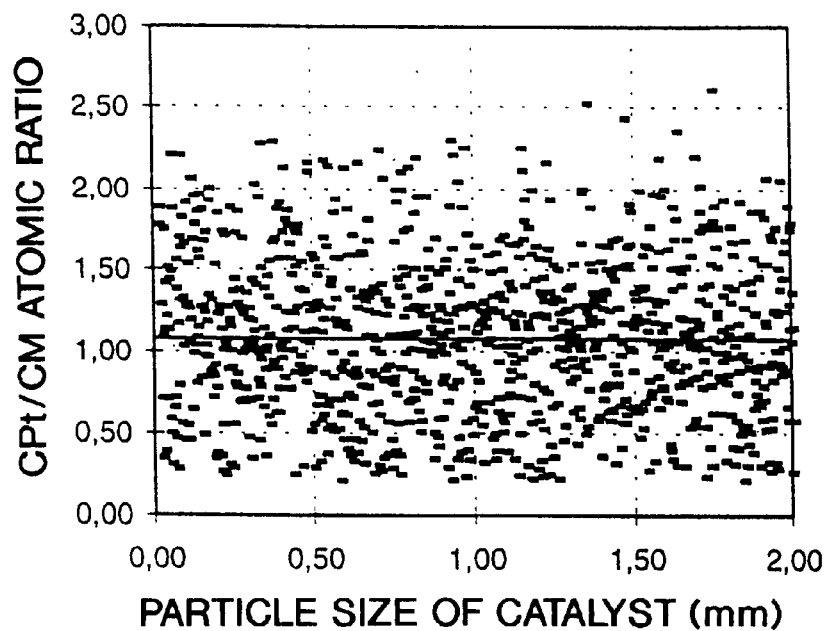

FIG. 2 corresponds to the prior art;

FIGS. 3A, 3B, 4 and 5 correspond to the invention as described in the examples below.

The general case described in the present patent is illustrated in FIGS. 1A, 1B, 3A and 3B; at least 70% of the $C_{Pt}/C_M$ or $C_{Pt}$, $C_x$ values for the catalyst particle bed deviate by a maximum of 30% from the corresponding local average ratio along a particle diameter. The $C_{Pt}/C_M$ values can describe a straight line (as in FIG. 3 which corresponds to catalysts B and C of the examples according to the present invention), or a parabola ("bowl" or "dome" distribution of FIGS. 1).

Very preferably, the catalyst contains at least one metal M uniformly distributed throughout the catalyst, the noble metal also being uniformly distributed through the catalyst particle.

In one technique of the invention, the catalyst is obtained by impregnating an organic solution of at least one compound of said metal M, the volume of the solution preferably being equal to the retention volume of the support or in excess with respect to that volume. Metal M is introduced in the form of at least one organic compound selected from the group formed by complexes of metals M and hydrocarbyl-metals such as metal alkyls, cycloalkyls, aryls, alkylaryls and arylalkyls. After leaving the solid and impregnating solution in contact for several hours, the product is then dried. The operation is normally completed by calcining between 300° C. and 600° C., preferably in a stream of air for several hours. The solid obtained is then impregnated using an aqueous or organic solution of at least one compound of a group VIII metal, the volume of the solution preferably being in excess with respect to the retention volume of the support or equal to that volume. After being left in contact for several hours, the product obtained is dried then calcined in air between 300° C. and 600° C., preferably in a stream of air for several hours.

In a further method in accordance with the invention, tin can be introduced during alumina synthesis using a sol-gel type technique (co-precipitation). As an example, a mixed tin alumina gel can be obtained by hydrolysing an organic solution of $Sn(OR)_4$ and $Al(OR')_4$ in a solvent such as ROH or R'OH. R and R' can designate a methyl, ethyl, isopropyl, n-propyl or butyl alkyl group or a heavier group such as n-hexyl. The alcoholic solvent must be severely dehydrated before introducing the tin and aluminium alcoholates. Hydrolysis can be achieved by adding water to the mixture or by adding an anhydrous carboxylic acid followed by gradual etherification (solvolysis) with heat. The second technique generally leads to more homogeneous $Al_2O_3$—$SnO_x$ mixed oxides as it results in homogeneous and simultaneous formation of water in the mixture. The reactivity of the tin alcoholates as regards water (hydrolysis) is generally higher than that of the aluminium alcoholates but it decreases with the length of the alkyl chain R. Thus the molecular weights of groups R and R' can be selected such that the reactivities of the corresponding aluminium and tin alcoholates are comparable. This can further improve the homogeneity of the metal distribution in the mixed gels obtained. Tin and aluminium can also be co-precipitated in an aqueous solution, for example by dissolving $SnCl_2$ and $AlCl_3$ in a solution acidified with HCl, then pouring the acid solution in the form of microdroplets (spray, nebulisation) into a solution in water with a pH in the range 6 to 9.

The metals can be introduced using any technique known to the skilled person. The additional metal can be introduced at any stage of the catalyst manufacture, for example during alumina synthesis using a sol-gel (co-precipitation) technique or when forming the catalyst (extrusion, oil-drop, or any known technique).

In accordance with the invention, the catalyst described above is used in processes for reforming gasoline and for producing aromatic compounds. Reforming processes increase the octane number of gasoline fractions from distilling crude oil and/or from other refining processes. Aromatic compound production processes provide bases (benzene, toluene and xylenes) for use in the petrochemicals industry. These processes are of additional importance in that they contribute to the production of large quantities of hydrogen which is indispensable for hydrogenation and hydrotreatment processes carried out in the refinery. These two processes differ from each other in the choice of operating conditions and in the composition of the feed, which facts are known to the skilled person.

In general, a typical feed treated by these processes contains paraffinic, naphthenic and aromatic hydrocarbons containing 5 to 12 carbon atoms per molecule. This feed is defined, inter alia, by its density and composition by weight. This feed is brought into contact with the catalyst of the present invention at a temperature in the range 400° C. to 700° C. The mass flow rate of the treated (feed per unit mass of catalyst can be from 0.1 to 10 kg/kg/h. The operating pressure can be set at between atmospheric pressure and 4 MPa. A portion of the hydrogen produced is recycled in a molar recycle ratio in the range 0.1 to 10. This ratio is the molar ratio of the flow rate of recycled hydrogen to the feed flow rate.

The following examples illustrate the invention without limiting its scope.

EXAMPLE 1

Comparative

The reference catalyst or catalyst A is a bimetallic Pt-Sn catalyst prepared using prior art techniques from $SnCl_2$, comprising 0.25% by weight of platinum, 0.14% by weight of tin and 1.2% by weight of chlorine. The support is a γ alumina with a specific surface area of 210 m² per gram. 500 cm³ of an aqueous hydrochloric acid solution and stannic chloride containing 0.14 g of tin was added to 100 g of alumina support. It was left in contact for 3 hours and drained. The solid was then brought into contact with 500 cm³ of an aqueous solution of hexachloroplatinic acid containing 0.25 g of platinum. It was left in contact for 3 hours, dried for 1 hour at 120° C. then calcined for 2 hours at 500° C.

EXAMPLE 2

In Accordance with the Invention

Catalyst B, with the same composition, is prepared by impregnating with an organometallic tin complex. 100 g of alumina support is brought into contact with 60 cm³ of an n-heptane solution containing 0.14 g of tin in the form of tetrabutyltin, $Sn(Bu)_4$. After 3 hours of reaction at ambient temperature, the solid is dried for 1 hour at 120° C. then calcined at 500° C. for 2 hours. 100 g of this solid is then brought into contact with 500 cm³ of an aqueous solution of hydrochloric acid and hexachloroplatinic acid containing 0.25 g of platinum. It is left in contact for 3 hours, dried for 1 hour at 120° C. then calcined for 2 hours at 500° C.

EXAMPLE 3

In Accordance with the Invention

Catalyst C is prepared by co-precipitating aluminium and tin in an aqueous solution followed by homogeneous deposition of platinum. It contains 0.25% by weight of platinum, 0.14% by weight of tin and 1.2% by weight of chlorine. A mixed $Al_2O_3$—$SnO_2$. $mH_2O$ hydroxide is prepared by co-precipitating a solution of stannic chloride and aluminium chloride at a pH of 8 using $NH_4NO_3$ as the precipitation agent. The precipitate is washed with distilled water and dried for 12 hours at 120° C. It is then calcined at 530° C. for 2 hours in air containing 500 ppm of $H_2O$. Platinum is then introduced into 100 g of this solid by bringing it into contact with 500 cm³ of a toluene solution containing 0.25 g of platinum in the form of platinum bis-acetylacetonate. It is left in contact for 3 hours, dried for 1 hour at 120° C. then calcined for 2 hours at 500° C. The solid is impregnated for an aqueous solution of HCl in order to adjust the Cl content on the catalyst to 1.2%. The solid obtained is then dried and calcined at 500° C. for 2 hours.

EXAMPLE 4

The local platinum and tin concentrations for the three catalysts A, B and C were measured using an electronic microprobe technique. FIGS. 2 (for catalyst A) and 3A (for catalyst B) and 3B (for catalyst C) have local dispersion ratios $C_{Pt}/C_{Sn}$ about the value of the local average ratio. For catalyst A, only 49% of the points were within the confidence interval (FIG. 2). Catalysts B and C of the present invention (FIG. 3) produced a far narrower dispersion of points, 8% and 14% respectively of the local $C_{Pt}/C_{Sn}$ ratios being outside the confidence interval.

EXAMPLE 5

Figure 4:
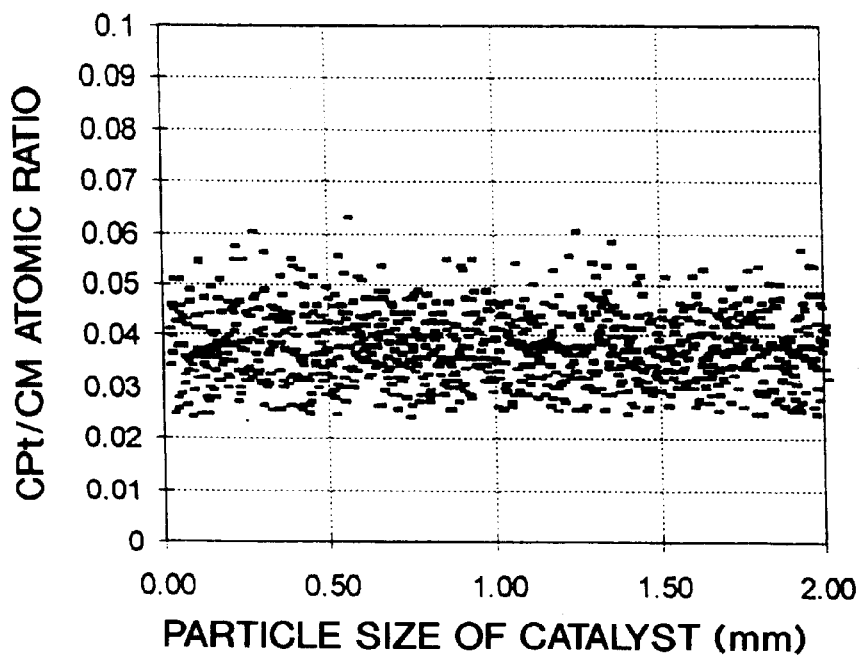
Figure 3A:
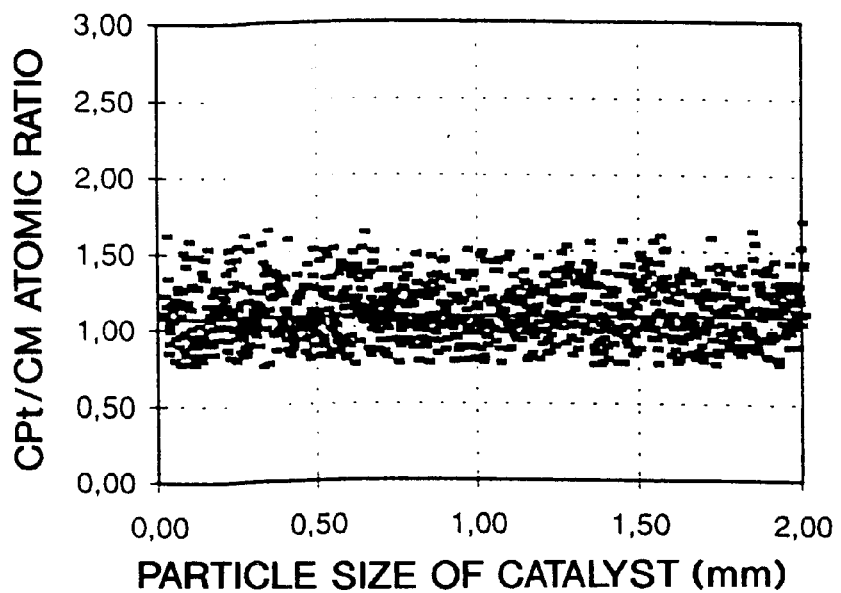
Figure 3B:
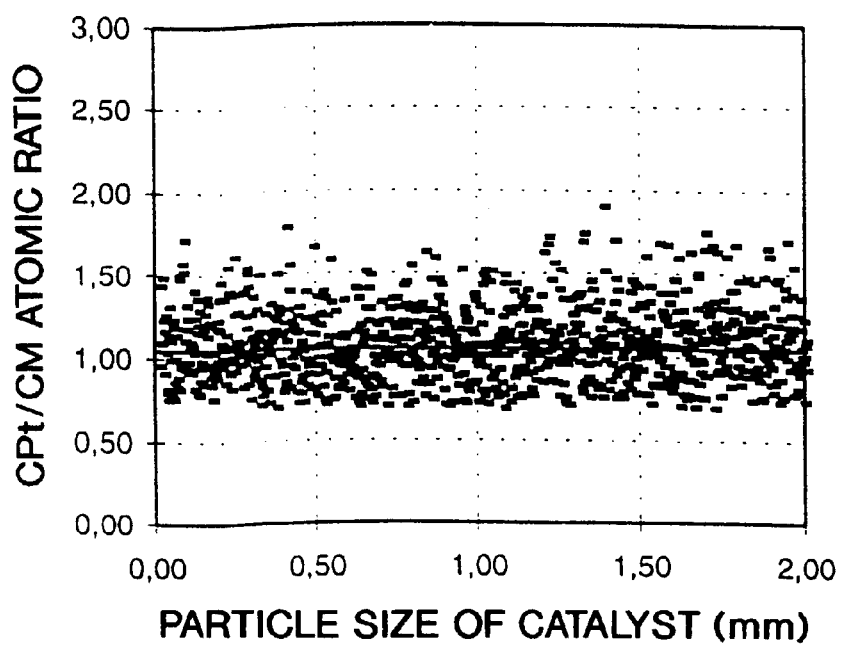

FIG. 4 illustrates the evolution of the ratios of local $C_{Pt}/C_{Cl}$ concentrations along the diameter of catalyst B particles. It can be seen that 9% of the points are outside the confidence interval.

EXAMPLE 6

Catalyst D containing 0.3% by weight of platinum and 0.32% by weight of tin and 1% of chlorine is prepared by impregnating a tin organometallic complex. A quantity of 100 g of alumina support is brought into contact with 60 cm³ of a n-heptane solution containing 0.32 g tin in the form of tetrabutyl tin $Sn(Bu)_4$. After 3 hours of reaction at ambient temperature, the solid is dried for 1 hour at 120° C., then calcined at 500° C. for 2 hours.

The platinum is then introduced on 100 g of this solid by being brought into contact with 500 cm³ of a toluene solution containing 0.3 g of platinum in the form of bis-platinum acetylacetonate. It is left in contact for 3 hours, dried for 1 hour at 120° C., and then calcined for 2 hours at 500° C. The solid is impregnated with 600 c³ of an aqueous hydrochloric acid solution in order to introduce 1% by weight of Cl (in relation to catalyst). It is left in contact for 3 hours, drained, and the solid is dried for 1 hour at 120° C. and calcined for 2 hours at 500° C.

The local concentrations of platinum and tin were measured using an electronic JEOL microprobe, counting time: 40 s, on 5 beads, 200 points.

Figure 5:
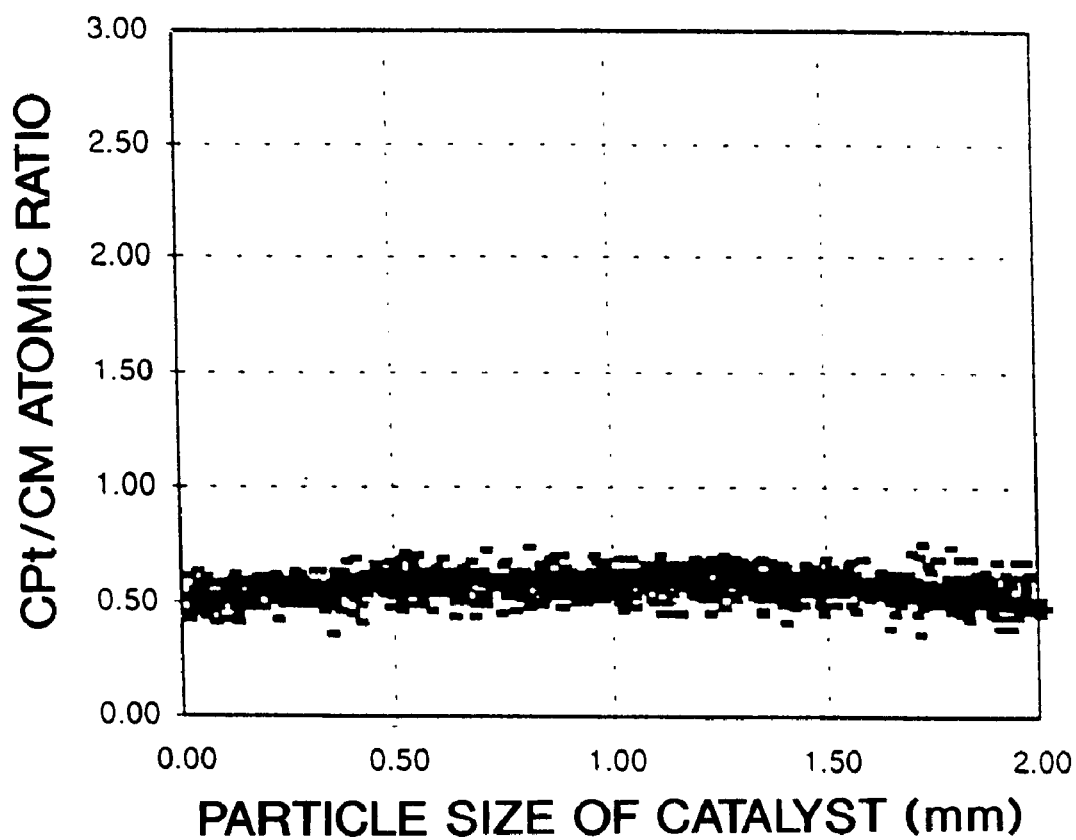

The local $C_{Pt}/C_M$ dispersion (atomic %) is given in FIG. 5, the deviation for 70% of the values is 9%.

As far as the overall dispersion is concerned, the deviation for 70% of the values is 11%. On each one of the 5 beads, the deviation for 70% of the values corresponding to the radial dispersion is 9, 10, 11, 11, 12% respectively.

EXAMPLE 7

Samples of catalysts A, B D and C, the preparation of which has been described above, were tested by transforming a feed with the following characteristics:

| | |
|---|---|
| Density at 20° C. | 0.753 kg/dm³ |
| Research octane number | ~60 |
| Paraffin content | 49.4% by volume |
| Naphthene content | 35.1% by volume |
| Aromatics content | 15.5% by volume |

This transformation was carried out in the presence of hydrogen under the following operating conditions:

| | |
|---|---|
| Temperature | 490° C. |
| Total pressure | 0.30 MPa |
| Feed flow rate | 2.0 kg per kg of catalyst |

Before injecting the feed, the catalysts were activated at high temperature in hydrogen for 2 hours. The performances obtained after 24 hours of operation are shown in the following table:

| Sample | Reformate yield (wt %) | Research octane number | Aromatics yield (wt %) | C4- yield (wt %) |
|---|---|---|---|---|
| A | 89.2 | 101.2 | 70.3 | 7.0 |
| B | 90.7 | 103.7 | 72.6 | 5.3 |
| C | 90.5 | 103.5 | 72.8 | 5.6 |
| D | 90.9 | 103.7 | 73.3 | 5.1 |

The catalytic performances of catalysts B, C and D are substantially better than those of catalyst A, both as regards the quantity of reformate produced and the octane number of the reformate.

What is claimed is:

1. A catalyst comprising at least one amorphous matrix, at least one noble metal, at least one additional metal M and at least one halogen, and in which, for one catalyst particle, $C_{Pt}$ is the local concentration of noble metal;
$C_M$ is the local concentration of additional metal M;
$C_x$ is the local concentration of halogen;

which catalyst is in the form of a homogeneous catalyst particle bed in which the local dispersion of the value of $C_{Pt}/C_M$ or $C_{Pt}/C_x$ is so that at least 70% of the values of $C_{Pt}/C_M$ or $C_{Pt}/C_x$ for the catalyst particle bed deviating by a maximum of 30% from the local average ratio.

2. A catalyst according to claim 1, for which, for a batch of particles the overall dispersion of the value of $C_{Pt}/C_M$ or $C_{Pt}/C_x$ is so that at least 70% of the values of $C_{Pt}/C_M$ or $C_{Pt}/C_x$ deviating by a maximum of 30% from the overall average ratio.

3. A catalyst according to claim 1, for which, for a catalyst particle, the radial dispersion of the value of $C_{Pt}/C_M$ or $C_{Pt}/C_x$ is so that at least 70% of the values of $C_{Pt}/C_M$ or $C_{Pt}/C_x$ deviating by a maximum of 30% from the average ratio in the particle.

4. A catalyst according to claim 1, containing 0.01–2% by weight of noble metal, more than 0.1% to at most 2% by weight of metal M and 0.1–15% by weight of halogen.

5. A catalyst according to claim 1, characterized in that the noble metal is platinum.

6. A catalyst according to claim 1, characterized in that the halogen is chlorine.

7. A catalyst according to claim 1, characterized in that the additional metal M is selected from the group formed by tin, germanium, lead, gallium, indium, thallium, rhenium, manganese, chromium, molybdenum and tungsten.

8. A catalyst according to claim 1, wherein said catalyst is selected from the group formed by catalysts containing Pt, Re; catalysts containing Pt, Re and In; catalysts containing Pt, Sn; catalysts containing Pt, Re, W; catalysts containing Pt, Re, In, W; and catalysts containing Pt, Sn, W.

9. A catalyst according to claim 1, wherein the ratio between the concentrations $C_{Pt}$ or $C_M$ or $C_x$ in the core of the catalyst and the respective concentrations $C_{Pt}$ or $C_M$ or $C_x$ in the periphery of the catalyst is 0.1:1 to 3:1.

10. A catalyst according to claim 1, the at least one metal M and the noble metal being uniformly distributed throughout the catalyst particle.

11. A catalyst according to claim 1, the at least one metal M being uniformly distributed throughout the catalyst, and the noble metal being bowl distributed.

12. A catalyst according to claim 1, the at least one metal M being uniformly distributed throughout the catalyst, and the noble metal being skin distributed.

13. A catalyst according to claim 1, characterized in that the metal M is tin.

14. A catalyst according to claim 1, characterized in that it contains platinum and tin in a bowl distribution.

15. A catalyst according to claim 1, characterized in that it comprises platinum and iridium as the noble metal.

16. A catalyst according to claim 1, characterized in that the values deviate by a maximum of 20%.

17. A catalyst according to claim 1, characterized in that the values deviate by a maximum of 15%.

18. A catalyst according to claim 1, characterized in that the values deviate by a maximum of 10%.

19. A catalyst according to claim 1, characterized in that the values deviate by a maximum of 7%.

20. A catalyst according to claim 1, characterized in that the values deviate by a maximum of 5%.

21. In a gasoline reforming process comprising contacting a paraffin-containing feed under gasoline reforming conditions with a catalyst, the improvement wherein the catalyst is in accordance with claim 1.

22. In a process for the production of aromatic compounds, comprising contacting a paraffin-containing feed with a catalyst under conditions for the production of aromatic compounds, the improvement wherein the catalyst is in accordance with claim 1.

* * * * *